United States Patent
Lin

(10) Patent No.: US 6,471,368 B1
(45) Date of Patent: Oct. 29, 2002

(54) SECONDARY ALERT LIGHT FOR MOTOR VEHICLES

(76) Inventor: Yu-Chu Lin, No. 477, Chung Shan N. Rd., Yung Kang City, Tainan Hsien (TW)

( * ) Notice: Subject to any disclaimer, the term of this patent is extended or adjusted under 35 U.S.C. 154(b) by 0 days.

(21) Appl. No.: 09/963,030

(22) Filed: Sep. 26, 2001

(51) Int. Cl.⁷ ............................ F21V 9/16; F21Y 101/02
(52) U.S. Cl. ...................... 362/216; 362/84; 362/247; 362/249; 362/540; 362/545
(58) Field of Search ............... 362/84, 216, 228, 362/234, 242, 243, 247, 249, 252, 260, 540, 542, 543–545, 548, 549, 800

(56) References Cited

U.S. PATENT DOCUMENTS

| | | | | |
|---|---|---|---|---|
| 2,798,147 A | * | 7/1957 | Orsatti | 362/84 |
| 3,759,084 A | * | 9/1973 | Plewka | 362/543 |
| 4,249,234 A | * | 2/1981 | Park et al. | 362/228 |
| 4,949,226 A | * | 8/1990 | Makita et al. | 362/544 |
| 5,567,036 A | * | 10/1996 | Theobald et al. | 362/545 |
| 5,595,438 A | * | 1/1997 | Burd | 362/216 |
| 6,193,400 B1 | * | 2/2001 | Schuster et al. | 362/544 |

* cited by examiner

*Primary Examiner*—Alan Cariaso
(74) *Attorney, Agent, or Firm*—Rosenberg, Klein & Lee

(57) ABSTRACT

A secondary alert light for a motor vehicle is composed of a light holder, a light convergence ring and light emission devices. Wherein, positioning posts protruding from a reflection cover on the light holder secures the light convergence ring which is light permeable having on one side provided with fluorescent material to collect the light, provided with posts to match those on the reflection cover and at least two grooves on its peripheral at equal spacing to house light emission devices for the light convergence ring collecting light emitted from the light emission devices by means of the light convergence material to create a significant light ring for improving alert effect.

6 Claims, 3 Drawing Sheets

SECONDARY ALERT LIGHT FOR MOTOR VEHICLES

BACKGROUND OF THE INVENTION (a) Field of the Invention

The present invention relates to a secondary alert light for motor vehicles, and more particularly to one that improves alert effects for the motor vehicle lights by means of a circumference light convergence ring to warn approaching or following vehicles.

(b) Description of the Prior Art

While riding or driving a motor vehicle at night, headlights are required to see clear the road ahead and alert approaching vehicles. A light holder to improve reflection from the headlight is only used for the prior art, the light intensity appears to be insufficient in case of riding or driving in fog or dim area.

Furthermore, when braking is applied, the brake light to the taillight is on to alert the following vehicles. However, it is difficult to tell whether the braking light is on or not, thus preventing an immediate alert to the drivers and that presents a potential hazard.

SUMMARY OF THE INVENTION

The primary purpose is to provide a secondary alert light essentially comprised of a light holder, a light convergence ring and multiple light emission devices to exaggerate alert effects. A light and a reflection shade are provided on the light holder and said light may be a braking light, a fog light or a headlight.

To achieve the purpose, positioning posts protruding from reflection cover of light holder are provided to secure a light convergence ring which relates to a light permeable member coated on one side of its circumference light converging material such as fluorescent material. Multiple positioning posts are provided on the circumference of the light convergence ring to match those multiple posts on the light holder. More than one positioning groove is provided at equal spacing to receive light emission devices.

By locking the light convergence ring with its coated circumference relative to the fight holder in position, light from the light emission devices is collected by the light convergence material coated on the light convergence ring to create a significant light ring beside the light on the motor vehicle for improving its alert effect.

DETAILED DESCRIPTION OF THE PREFERRED EMBODIMENTS

Figure 1:
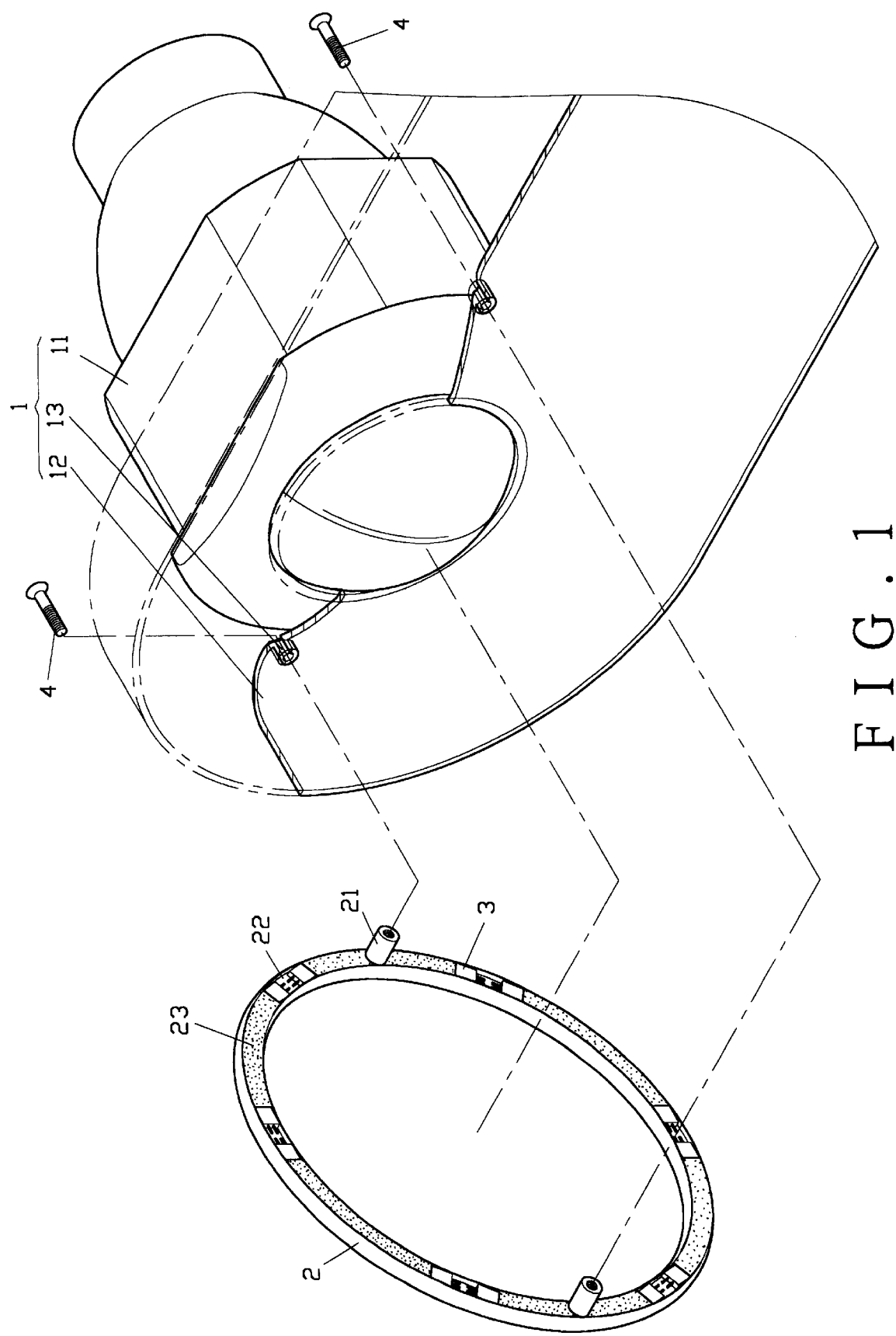
FIG. 1 is an exploded view of a preferred embodiment of the present invention.

Referring to FIG. 1, a preferred embodiment of the present invention is essentially composed of a light holder (1), a light convergence ring (2) and multiples of light emission device (3). The light holder (1) is provided with a light (11) and a reflection cover (12). The light (11) may be of a braking light, a fog light or a headlight while two positioning posts (13) to secure the light converge ring (2) are provided protruding from the reflection cover (12) relative to the outer circumference of the light (11).

The light convergence ring (2) related to a light permeable member incorporating two positioning posts (21) on its circumference to match the two positioning posts (13) provided on the light holder (1). Two or more than two positioning grooves (22) am provided at equal spacing in the circumference of the light convergence ring (2) and two pieces of light emission devices (3) facing each other are placed in each of said positioning grooves (22) The light emission device (3) may be of a light emission diode generally referred to as an LED. The light emission device (3) emits light by being subject to the control by a drive circuit (which is not described in details since it is not sought for a claim in this application). One side of the circumference of the light convergence ring (2) slightly indicates concave to receive a light convergence material (23) which may be of a fluorescent coating or sticker to be sprayed or flush adhered over the concave.

Figure 2:
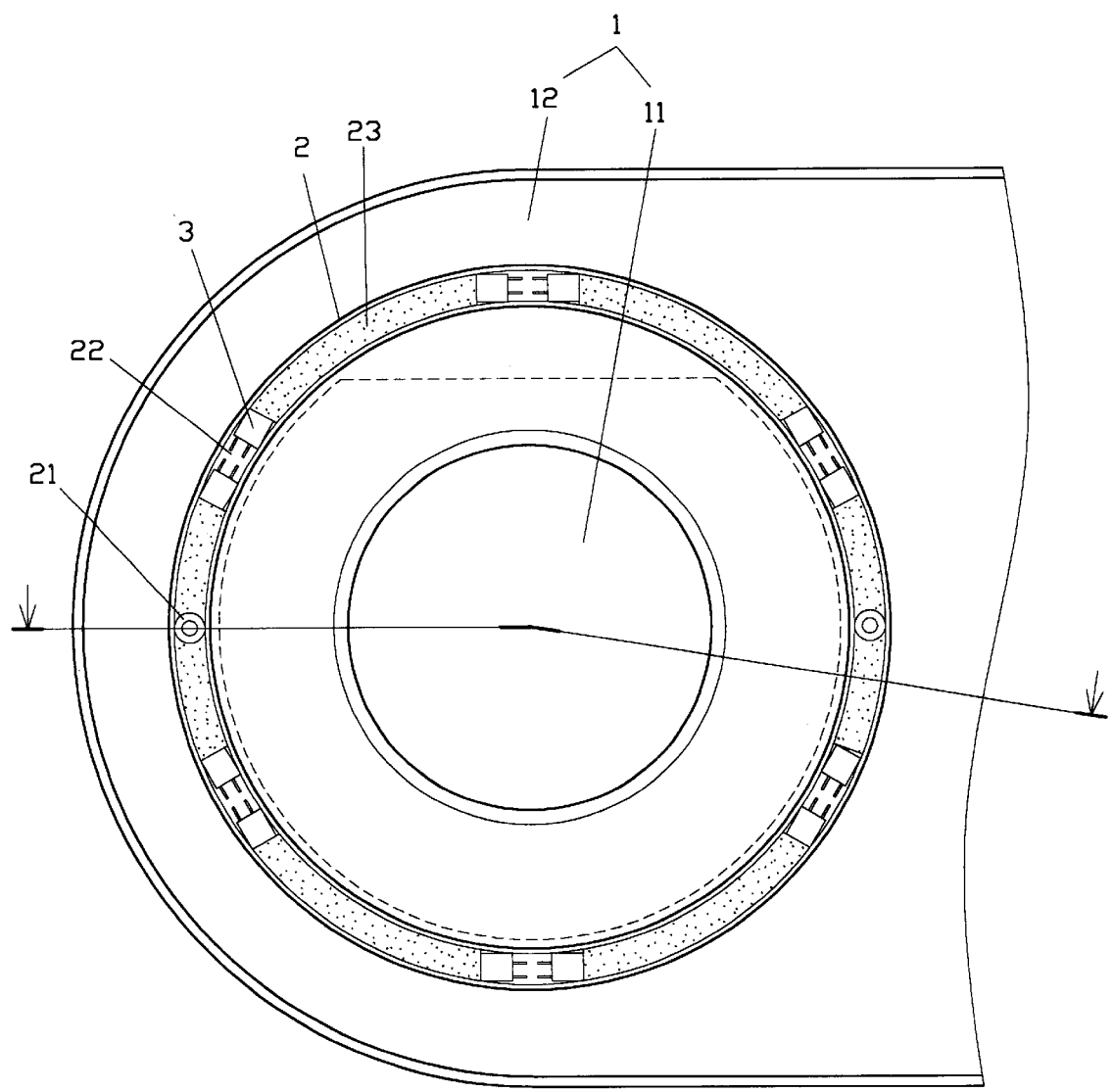
FIG. 2 is a front view of an assembly of the preferred embodiment of the present invention.
Figure 3:
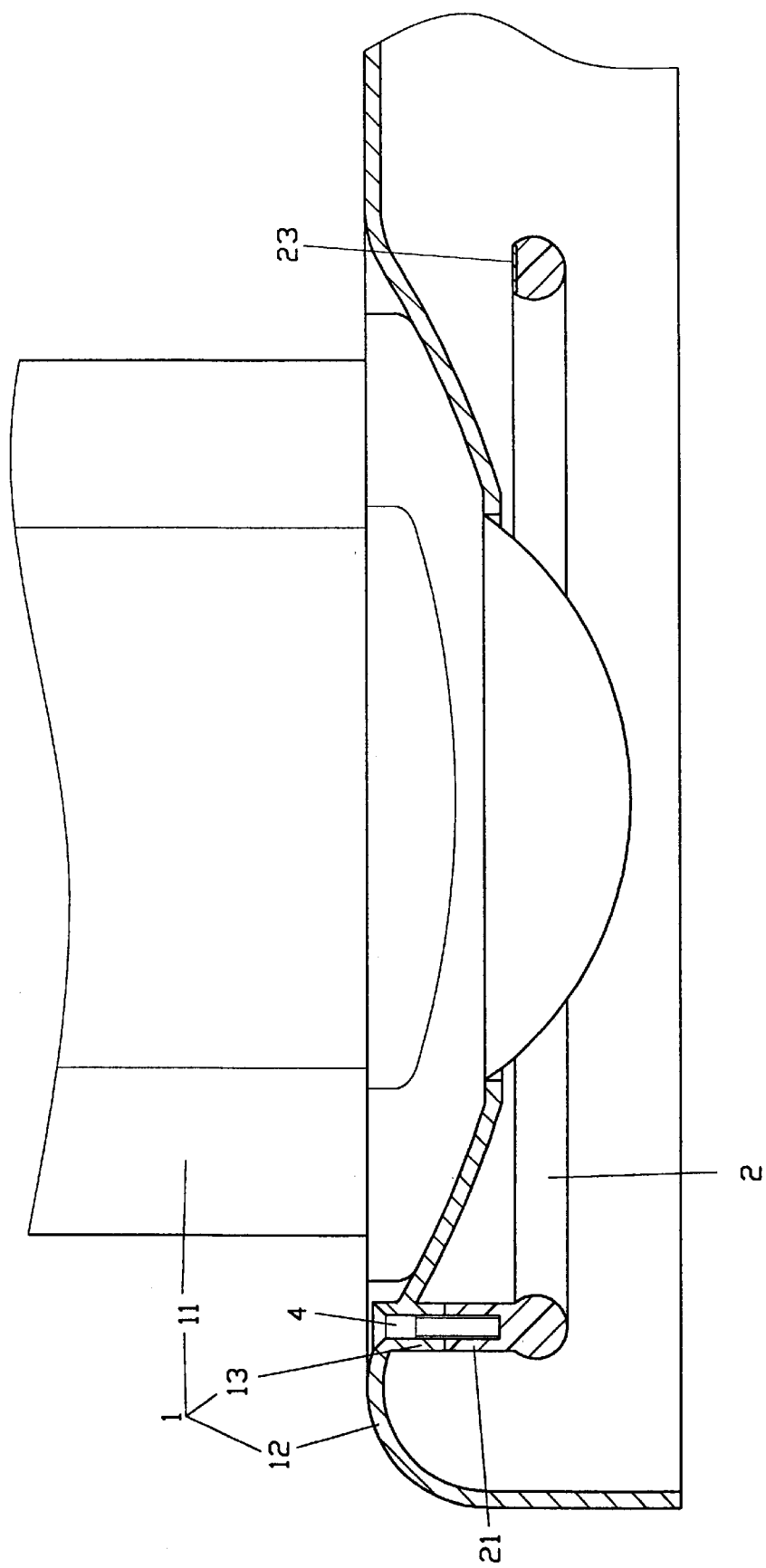
FIG. 3 is a sectional view of the assembly of the preferred embodiment of the present invention.

Upon assembling as illustrated in FIGS. 2 and 3, two of said light emission devices (3) are inserted into each positioning groove (22) on the light convergence ring (2) with their light emission ends disposed at the distal ends of the grove (22). Then each groove (22) is fully coated with a transparent insulation glue and said two light emission devices (3) are secured inside the positioning groove (22). A fastening device (4) is used to interlock the two positioning posts (21) from the light convergence ring (2) and those positioning posts (13) on the light holder (1). When the light (11) is turned on, it is projected by the reflection cover (12) on the light holder (1). Those light emission devices (3) simultaneously (or otherwise as determined by the design of the drive circuit controlling the light emission devices) emit the light by the unit of the grove (22). As the light convergence ring (2) is light permeable, the light emitted from the light emission devices (3) inside the grooves (22) is incorporated into the light source by means of the material of the light convergence ring (2). The light is first converged by the light convergence material (23) coated on or adhered to the peripheral of the light convergence ring (2). Consequently, a significant light ring is created to the peripheral of the light (11) to improve the appearance and more important the alert effect of the light (11) of the light holder (1).

Furthermore, the light convergence ring (2) for being made of transparent acrylic material may be formed together with the fluorescent material. As a result, the product of the light convergence ring (2) contains the light convergence material (23) to collect the light emitted from the light emission devices (3) to create a significant light ring to the peripheral of the light (11).

The present invention as disclosed effectively provides a secondary lighting structure for the existing light in a motor vehicle to effectively alert both approaching vehicles in the opposite direction and following vehicles behind to immediately identify the location of the vehicle in between.

I claim:

1. A secondary alert light for motor vehicles comprising a light holder with a reflection cover, a light convergence ring and multiple light emission devices characterized by that:

two or more than two positioning posts being provided on the reflection cover of the light holder to secure the light convergence ring which is light permeable; and fluorescent material for light convergence being provided on one side of the periphery of the light convergence ring; two or more than two positioning posts formed on the periphery of the light convergence ring to match those on the light holder, and two or more than two positioning grooves being arranged at equal spacing on the surface of the circumference of the light convergence ring to house the light emission devices;

thus, the light convergence ring collecting light from the light emission devices by means of the light convergence material provided on its periphery to create a significant light ring by the light of the motor vehicle to produce an alert effect.

2. A secondary alert light for motor vehicles as claimed in claim 1, wherein, each of the light emission devices comprises a light emission diode.

3. A secondary alert light for motor vehicles as claimed in claim 1, wherein, one side of the circumference of the light convergence ring is slightly concave to receive light convergence material.

4. A secondary alert light for motor vehicles as claimed in claim 1, wherein, the light convergence material comprises a fluorescent coating or sticker.

5. A secondary alert light for motor vehicles as claimed in claim 3, wherein, the light convergence material comprises a fluorescent coating or sticker.

6. A secondary alert light for motor vehicles as claimed in claim 1, wherein, in a mold injection process, the material of the light convergence ring is blended with the light convergence material.

* * * * *